C. Applebee,
Shearing Metal,
No. 13,295. Patented July 24, 1855.

N. PETERS, PHOTO-LITHOGRAPHER, WASHINGTON, D. C.

UNITED STATES PATENT OFFICE.

CEPHAS APPLEBEE, OF LYNDON, VERMONT.

MACHINE FOR CUTTING SHEET METAL.

Specification of Letters Patent No. 13,295, dated July 24, 1855.

*To all whom it may concern:*

Be it known that I, CEPHAS APPLEBEE, of Lyndon, in the county of Caledonia and State of Vermont, have invented a new and useful Machine for Cutting or Reducing Plates of Metal or other Material to Annular Sections; and I do hereby declare that the same is fully described and represented in the following specification and the accompanying drawings, letters, figures, and references thereof.

Figure 1:
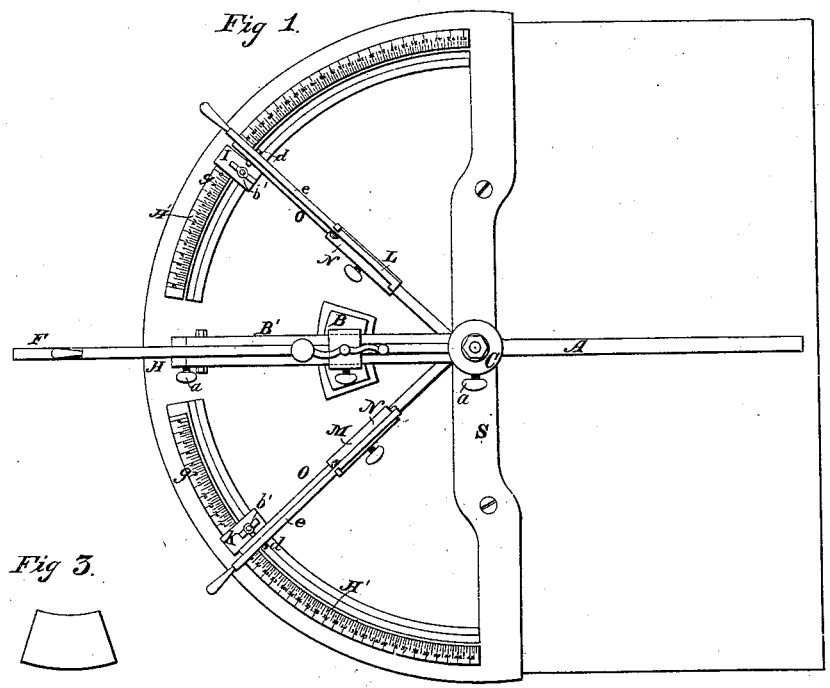
Figure 3:
Figure 2:
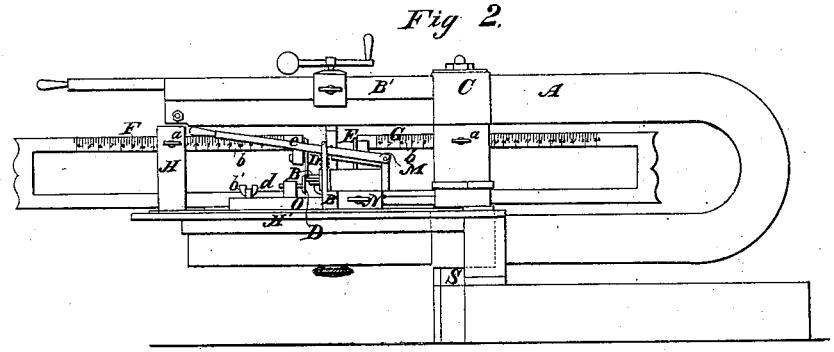

Of the said drawings, Figure 1, denotes a top view of the said machine; Fig. 2, is a side elevation of it; Fig. 3, is an annular section of a piece of metal, or is the form to which it is to be reduced, by such machine.

Figure 4:
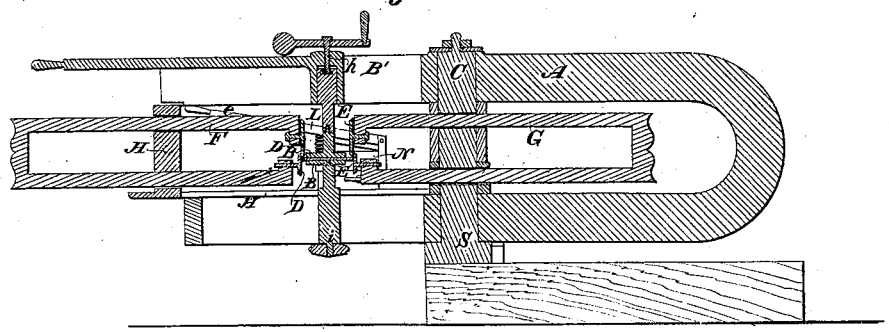

In such drawings A denotes a movable frame which turns horizontally upon a vertical center post, C, extended up from a base plate S, and carries a set of movable clamps B, B, which are applied to it and constructed like those in common use in tin plate cutting machines. They are made movable in directions either toward or away from the supporting post of the bar B', and are provided with contrivances (or screws as seen at $h$, $i$,) by which they may not only be moved toward one another, but be fixed in any desirable position within the limits of their movements. The said bar, B', during its horizontal movements carries the clamps, B, B, between two sets of rotary cutting shears or cutters arranged as seen at D D or E E, the same being exhibited in Fig. 4, which is a transverse and vertical section taken through the bar B', the said cutters, and clamps.

Each set of cutters is sustained by a sliding frame, E, or G, which is supported by and slides through a post, C, or H, there being a clamp screw, $a$, applied to such post to hold the frame in any position, or in other words, to maintain the two sets of rotary cutters at any suitable distance asunder, such being determined by a divided scale $b'$, made in the frame, F, or G, as seen in Fig. 2.

The frame or bar, A, operates in connection with a semicircular limb or index arc H', and two movable stops I, K, which are made movable on the limb, and fixed in position thereon by clamp screws and nuts as seen at, $b$, $b$, in Figs. 1, and 2. Such stops arrest the movement of the bar A, and so as to determine the proper extent of motion of the plate of metal, cut by the rotary cutters, in order to introduce its front between one of two pair of end shears L, M, arranged as seen in Figs. 1, and 2. Each set of end shears is applied to a carriage, N, which is supported and slides on a long bar or arm, O, which turns freely on the post, C, at one end, while at its other end, it rests on the divided limb or arc, H, and is provided with a clamp screw (as seen at $d$) by which it may be fastened or clamped to the limb.

A hand lever, $e$, carries the upper blade of the end shears and when a metal plate has been introduced between the clamps B, B, the shears serve to cut off its ends so as to reduce the plate to the length required, the positions of the end shears being properly regulated by the scales of divisions on the limb or arc, H, such scales being seen at $g$, $g$, in Fig. 1.

In operating with my machine, a piece of sheet metal is first placed and confined between the clamps B, B. This having been done, the frame, A, is moved back or toward the left until it is arrested by the stop, I, and so as to introduce said piece of metal between the blades of the left end shears. The attendant or workman next forces down the upper blade of the shears and cuts off the end of the plate. He next moves the bar, A, so as to force the metallic plate between the rotary cutters and cause them to reduce it to the section of an annulus and he continues to move the bar until it abuts against the stop K, and the opposite end of the plate is introduced between the blades of the right pair of end shears, next forcing down their lever and thereby cutting off the plate to the length required. The arm or section so made is of the proper shape to be converted into a frusto-conical form, when it is bent around so that its two ends may meet together, such being the form which it is to receive, in order to enable it to be used in the manufacture of a tea or coffee pot or vessel of a frusto-conical shape.

I do not claim the movable bar A, its clamps, and one or two sets of rotary cutters arranged and operating together as described, but What I do claim is—

The combination therewith of the index limb or arc, the movable radial supporting arms, and their two end shears, the whole being applied together, and used to operate on a piece of metal or other material and reduce it to the shape of an annular section, suitable for being bent into the shape of a conic frustum in manner and for the purpose as specified.

In testimony whereof I have hereunto set my signature this eighth day of May A. D. 1855.

CEPHAS APPLEBEE.

Witnesses:
Wm. H. McGaffey,
G. W. McGaffey.